(12) United States Patent
Hironaka

(10) Patent No.: US 6,718,450 B2
(45) Date of Patent: Apr. 6, 2004

(54) MEMORY MANAGEMENT SYSTEM, COMPUTER PROGRAM THEREOF AND MEMORY MANAGEMENT METHOD FOR SYSTEM PROTECTION

(75) Inventor: Yasufumi Hironaka, Tokyo (JP)

(73) Assignee: NEC Corporation, Tokyo (JP)

( * ) Notice: Subject to any disclaimer, the term of this patent is extended or adjusted under 35 U.S.C. 154(b) by 246 days.

(21) Appl. No.: 09/986,331

(22) Filed: Nov. 8, 2001

(65) Prior Publication Data

US 2002/0059507 A1 May 16, 2002

(30) Foreign Application Priority Data

Nov. 15, 2000 (JP) ........................................ 2000-347585

(51) Int. Cl.[7] .............................................. G06F 12/00
(52) U.S. Cl. ..................... 711/170; 711/156; 711/171
(58) Field of Search ................................. 711/170, 171, 711/156

(56) References Cited

U.S. PATENT DOCUMENTS

| 5,473,690 | A | * | 12/1995 | Grimonprez et al. | 705/66 |
| 5,561,785 | A | * | 10/1996 | Blandy et al. | 711/170 |
| 5,852,818 | A | * | 12/1998 | Guay et al. | 707/1 |
| 5,928,365 | A | * | 7/1999 | Yoshida | 713/324 |
| 5,949,972 | A | * | 9/1999 | Applegate | 714/54 |
| 6,035,426 | A | * | 3/2000 | Applegate | 714/54 |
| 6,208,273 | B1 | * | 3/2001 | Dye et al. | 341/51 |
| 6,467,075 | B1 | * | 10/2002 | Sato et al. | 716/18 |

FOREIGN PATENT DOCUMENTS

| JP | 63-310043 | 12/1988 |
| JP | 1-222346 | 9/1989 |
| JP | 2-108148 | 4/1990 |
| JP | 11-212858 | 8/1999 |

* cited by examiner

Primary Examiner—Reba I. Elmore
(74) Attorney, Agent, or Firm—Foley & Lardner

(57) ABSTRACT

In the memory management method for managing a memory and for causing an application to execute using the memory, the memory management method comprising:

registering an allocatable memory region for causing the application to execute on a memory management table provided for memory management;

receiving an allocation request, in a case in which the application issues the allocation request for requesting to allocate a necessary memory size to the application, determining whether or not the memory size requested by the allocation request is allocatable to the application; and registering the memory size and a region allocated for the memory size on the memory management table and notifying the application that the requested memory size has been allocated, if the memory size is allocatable based on the determination, and notifying the application that the requested memory size is non-allocatable, if the requested memory size is non-allocatable.

6 Claims, 2 Drawing Sheets

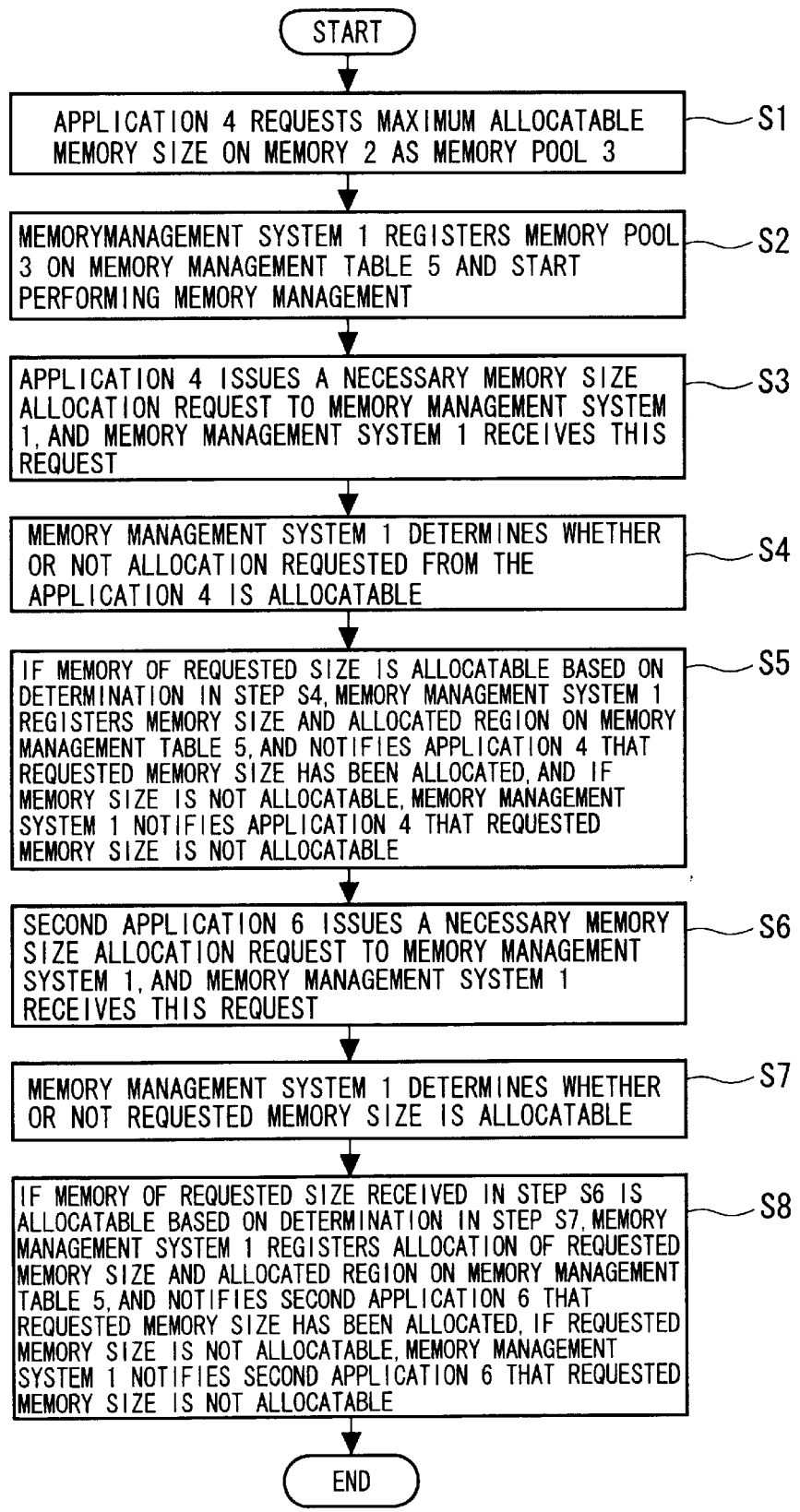

MEMORY MANAGEMENT SYSTEM, COMPUTER PROGRAM THEREOF AND MEMORY MANAGEMENT METHOD FOR SYSTEM PROTECTION

BACKGROUND OF THE INVENTION

1. Field of the Invention

The present invention relates to a memory management system, a computer program thereof and a memory management method. The present invention particularly relates to a memory management system and a memory management method enabling establishing a highly reliable system.

2. Description of the Related Art

The capacity of an RAM (random-access memory which will be referred to as "memory" hereinafter) is very limited in a built-in equipment, and an application operating in the built-in equipment is, therefore, required to efficiently use the memory. Recently, there are cases where an application is downloaded from an external of the equipment through an external interface. In these cases, it is impossible to know in advance that the application thus downloaded operates stably in the equipment. A system executing and managing the application, therefore, desirably has a function to protect the system itself by some method.

Nevertheless, no measures have been taken for the conventional equipment, with the result that the entire system disadvantageously malfunctions due to the trouble of the application.

SUMMARY OF THE INVENTION

It is an object of the present invention to provide a novel memory management system and a management method therefor as well as a memory management system using the memory management method capable of limiting an application from illegally using a memory and protecting the system itself by registering a memory size to be used by the application dynamically using the memory in advance for the memory management system which is a system managing the dynamic memory, and by prohibiting the application from using the memory to exceed the registered memory size.

It is another object of the present invention to provide a computer program for managing the memory management system.

To attain the above-stated objects, the present invention basically adopts the following technical configurations.

The first aspect of the present invention is a memory management system for managing memory and for causing an application to execute using the memory, the memory management system comprising: a first means for registering an allocatable memory region for causing the application to execute on a memory management table provided for memory management; a second means for receiving an allocation request, in a case in which the application issues the allocation request for requesting to allocate a necessary memory size to the application, to the memory management system; a third means for determining whether or not the memory size requested by the allocation request is allocatable to the application; and a fourth means for registering the memory size and a region allocated for the memory size on the memory management table and notifying the application that the requested memory size has been allocated, if the memory size is allocatable based on determination of the third means, and for notifying the application that the requested memory size is non-allocatable, if the requested memory size is non-allocatable.

The second aspect of the present invention is a memory management system comprising a fifth means for receiving a second allocation request, in a case in which a second application that is different from the application issues the second allocation request for requesting to allocate a necessary memory size to the second application, to the memory management system; a sixth means for determining whether or not the memory size requested by the second allocation request is allocatable to the second application; and a seventh means for registering the memory size and a region allocated for the memory size on the memory management table and notifying the second application that the requested memory size has been allocated, if the memory size is allocatable based on determination of the sixth means, and for notifying the second application that the requested memory size is non-allocatable, if the requested memory size is non-allocatable.

BRIEF DESCRIPTION OF THE DRAWINGS

FIG. 2 is a flow chart for the memory management system according to the present invention.

DETAILED DESCRIPTION OF THE PREFERRED EMBODIMENTS

Figure 1:
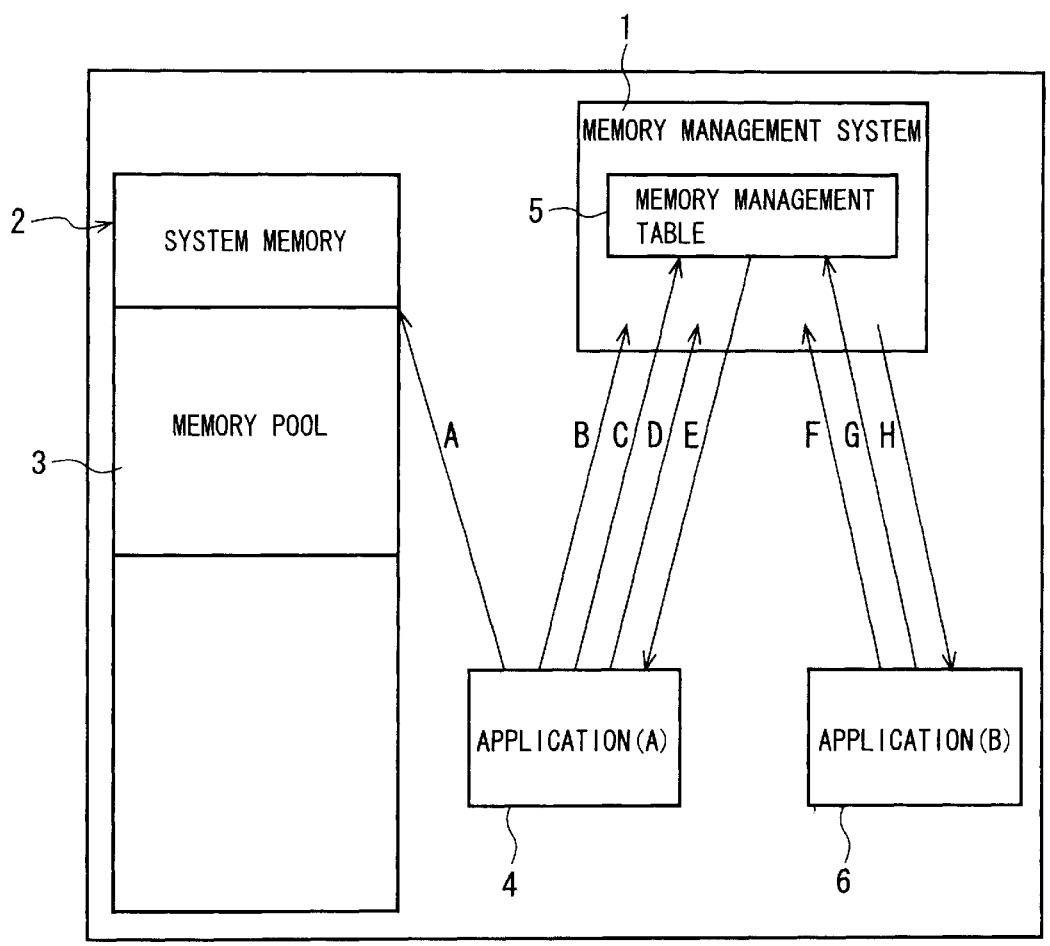
FIG. 1 is a block diagram of a memory management system according to the present invention.

The embodiments of a memory management system, a computer program thereof and a memory management method according to the present invention will be described hereinafter in detail with reference to the drawings.

First Embodiment

FIG. 1 is a block diagram of a memory management system according to the present invention. FIG. 2 is a flow chart showing the operations of the first embodiment. In FIGS. 1 and 2, there is shown a memory management system 1 for managing a memory 2 and for causing an application 4 to execute using the memory 2, the memory management system 1 comprising: a first means (step S2) for registering an allocatable memory region 3 for causing the application 4 to execute on a memory management table 5 provided for memory management; a second means (step S3) for receiving an allocation request, in a case in which the application 4 that is executed on the memory region 3 issues the allocation request for requesting to allocate a necessary memory size to the application 4, to the memory management system 1; a third means (step S4) for determining whether or not the memory size requested by the allocation request is allocatable to the application 4; and a fourth means (step S5) for registering the memory size and a region allocated for the memory size on the memory management table 5 and notifying the application 4 that the requested memory size has been allocated, if the memory size is allocatable based on determination of the third means, and for notifying the application 4 that the requested memory size is non-allocatable, if the requested memory size is non-allocatable.

The first embodiment will be described in more detail.

In FIG. 1, reference numeral 1 denotes a memory management system for managing a memory used by an applications (A) 4 and an applications (B) 5, 2 denotes an entire memory region mounted on the system, 3 denotes a dynamically usable memory pool secured by the applications and managed by the memory management system 1, 4 denotes the application requesting use of the memory to the memory management system 1, and 5 denotes a memory management table provided in the memory management system 1 to manage the memory pool 3.

Next, the operations of the first embodiment of the present invention will be described in detail with reference to FIGS. 1 and 2.

First, the application 4 statically secures the memory pool 3 of a maximum necessary size to be dynamically allocated as a dynamic memory from the entire memory region 2 provided on the system in the initial stage of system start (A in FIG. 1). Next, if the application 4 issues a registration request to the memory management system 1 to make the memory management system 1 manage the secured memory pool 3 as a memory pool allocated as a dynamic memory (B in FIG. 1; the step S1), the memory management system 1 registers the memory pool 3 for which the application 4 issued the registration request, on the memory management system 5 (C in FIG. 1; the step S2). Through the operations carried out so far, the memory pool 3 is turned into a state in which the pool 3 can be used by the application 4.

Next, if the application 4 is executed and turned into a state of requiring a memory, the application 4 issues a memory allocation request to the memory management system (D in FIG. 1; the step S3). This memory allocation request includes information on the necessary memory size. In response to the memory allocation request, the memory management system 1 refers to the memory management table 5 and determines whether the allocation request is from the application permitted to use the memory and determines whether the requested memory size is allocatable to the memory pool 3 (in the step S4). If the allocation request is from the application permitted to use the memory and the requested memory size is allocatable, then the memory management system 1 allocates the memory on the memory pool 3 to the application 4 (E in FIG. 1). At this moment, the memory management system 1 registers and manages memory allocation information. If the allocation request is not from the application permitted to use the memory or the requested memory size is not secured and the requested memory size is not allocatable to the application 4, the memory management system 1 notifies the application 4 that the memory is not allocatable to the application 4 (in the step S5). By so constituting the memory management system 1, it is possible to prevent the application 4 from using the memory to exceed the size of the memory pool 3 registered in advance. In addition, once the allocated memory becomes unnecessary to the application 4, the application 4 returns the memory to the memory management system 1. If so, the allocation information is deleted from the memory management table 5 and the memory is turned into an allocatable state again.

Even if the application 4 is further executed and needs to use the memory, because the memory management system 1 always manages whether or not the memory is allocable as stated above, the memory is not consumed unlimitedly and system reliability is considerably improved.

Second Embodiment

FIG. 2 shows the second embodiment of the present invention and particularly shows a memory management system comprising a fifth means (step S6) for receiving a second allocation request, in a case in which a second application 6 that is different from the application 4 issues the second allocation request for requesting to allocate a necessary memory size to the second application 6, to the memory management system 1; a sixth means (step S7) for determining whether or not the memory size requested by the second allocation request is allocatable to the second application 6; and a seventh means (step S8) for registering the memory size and a region allocated for the memory size on the memory management table 5 and notifying the second application 6 that the requested memory size has been allocated, if the memory size is allocatable based on determination of the sixth means, and for notifying the second application 6 that the requested memory size is non-allocatable, if the requested memory size is non-allocatable.

The second embodiment will be described in more detail.

The second application (B) 6 issues a memory allocation request to the memory management system 1 so that the application 6 can use the memory pool 3 (F in FIG. 1). If the memory management system 1 receives this memory management request (in the step S6) and determines that the memory is allocatable to the application (B) 6, then the memory management system 1 conducts registration for permitting the application (B) 6 to use the memory pool 3 as in the case of the first embodiment stated above (G in FIG. 1). By so constituting the memory management system, it is possible to share the memory pool 3 between the application (A) 4 and the application (B) 6 under the management of the memory application system 1 (in the step S8). Thereafter, if the application (B) 6 needs a memory, the application (B) 6 issues a memory allocation request to the memory management system 1. If the memory is allocatable, the memory of the requested size is allocated to the application (B) 6 from the memory pool 3.

As stated so far, according to the present invention, the memory management system assumes management so that an application cannot acquire a memory of a size exceeding a registered memory size. Due to this, if a memory acquisition request is semipermanently repeated due to the trouble of a program or a malicious program is downloaded from a network server and executed, it is possible to prevent the system from malfunctioning because of excessive memory acquisition and to ensure protecting the system.

What is claimed is:

1. A memory management system for managing a memory and for causing an application to execute using said memory, said memory management system comprising:

a first means for registering an allocatable memory region for causing said application to execute on a memory management table provided for memory management;

a second means for receiving an allocation request, in a case in which said application issues said allocation request for requesting to allocate a necessary memory size to said application, to said memory management system;

a third means for determining whether or not said memory size requested by said allocation request is allocatable from said allocatable memory region to said application; and a fourth means for registering said memory size and a region allocated for said memory size on said memory management table and notifying said application that said requested memory size has been allocated, if said memory size is allocatable from said allocatable memory region based on determination of said third means, and for notifying said application that said requested memory size is non-allocatable, if said requested memory size is non-allocatable from said allocatable memory region based on determination of said third means.

2. The memory management system according to claim 1, wherein said memory management system further comprising:

a fifth means for receiving a second allocation request, in a case in which a second application issues said second allocation request for requesting to allocate a second necessary memory size to said second application, to said memory management system, said second application being different from said application;

a sixth means for determining whether or not said second memory size requested by said second allocation request is allocatable from said allocatable memory region to said second application; and a seventh means for registering said second memory size and a region allocated for said second memory size on said memory management table and notifying said second application that said requested second memory size has been allocated, if said second memory size is allocatable from said allocatable memory region based on determination of said sixth means, and for notifying said second application that said requested memory size is non-allocatable, if said requested memory size is non-allocatable from said allocatable memory region based on determination of said sixth means.

3. A memory management method for managing a memory and for causing an application to execute using said memory, said method comprising the steps of:

a) registering an allocatable memory region for causing said application to execute on a memory management table provided for memory management;

b) receiving an allocation request, in a case in which said application issues said allocation request for requesting to allocate a necessary memory size to said application;

c) determining whether or not said memory size requested by said allocation request is allocatable from said allocatable memory region to said application; and d) registering said memory size and a region allocated for said memory size on said memory management table and notifying said application that said requested memory size has been allocated, if said memory size is allocatable from said allocatable memory region based on said determining in step c), and notifying said application that said requested memory size is non-allocatable, if said requested memory size is non-allocatable from said allocatable memory region based on determining in step c).

4. The memory management method according to claim 3, wherein said method further comprising the steps of:

e) receiving a second allocation request, in a case in which a second application issues said second allocation request for requesting to allocate a second necessary memory size to said second application, said second application being different from said application;

f) determining whether or not said second memory size requested by said second allocation request is allocatable from said allocatable memory region to said second application; and g) registering said second memory size and a region allocated for said second memory size on said memory management table and notifying said second application that said requested second memory size has been allocated, if said second memory size is allocatable from said allocatable memory region based on said determining in step f), and notifying said second application that said requested memory size is non-allocatable, if said requested memory size is non-allocatable from said allocatable memory region.

5. A computer program for a memory management system for managing a memory and for causing an application to execute using said memory, said computer program comprising the steps of:

a) registering an allocatable memory region for causing said application to execute on a memory management table provided for memory management;

b) receiving an allocation request, in a case in which said application issues said allocation request for requesting to allocate a necessary memory size to said application;

c) determining whether or not said memory size requested by said allocation request is allocatable from said allocatable memory region to said application; and d) registering said memory size and a region allocated for said memory size on said memory management table and notifying said application that said requested memory size has been allocated, if said memory size is allocatable from said allocatable memory region based on said determining in step c), and notifying said application that said requested memory size is non-allocatable, if said requested memory size is non-allocatable from said allocatable memory region based on said determining in step c).

6. The computer program according to claim 5, wherein said computer program further comprising the steps of:

e) receiving a second allocation request, in a case in which a second application issues said second allocation request for requesting to allocate a second necessary memory size to said second application, said second application being different from said application;

f) determining whether or not said second memory size requested by said second allocation request is allocatable from said allocatable memory region to said second application; and g) registering said second memory size and a region allocated for said second memory size on said memory management table and notifying said second application that said requested second memory size has been allocated, if said second memory size is allocatable from said allocatable memory region based on said determining in step f), and notifying said second application that said requested memory size is non-allocatable, if said requested memory size is non-allocatable from said allocatable memory region.

* * * * *